United States Patent [19]

Benshoff et al.

[11] Patent Number: 4,745,820

[45] Date of Patent: May 24, 1988

[54] AUXILIARY ROTARY ACTUATOR FOR A STANDARD PLUNGER OPERATED DEVICE

[75] Inventors: Richard G. Benshoff; Ernest R. Remillard, both of Sarasota, Fla.

[73] Assignee: Eaton Corporation, Cleveland, Ohio

[21] Appl. No.: 346

[22] Filed: Jan. 5, 1987

[51] Int. Cl.⁴ .................. F16H 25/18; F16H 53/00
[52] U.S. Cl. ................................... 74/107; 74/567
[58] Field of Search .............. 74/56, 99 R, 99 A, 107, 74/567, 569; 464/37-39, 42-44

[56] References Cited

U.S. PATENT DOCUMENTS

| | | | |
|---|---|---|---|
| 25,599 | 9/1959 | Wood | 74/107 |
| 675,020 | 5/1901 | Schmick | 74/56 |
| 933,718 | 9/1909 | Mahoney | 74/56 |
| 2,062,593 | 12/1936 | McCloud | 464/39 |
| 2,196,416 | 4/1940 | Jacob | 74/56 |
| 2,621,614 | 12/1952 | Walling | 74/56 |
| 2,936,652 | 5/1960 | Gunzner | 74/567 |
| 3,142,187 | 7/1964 | Kane et al. | 74/107 |
| 3,260,131 | 7/1966 | Miles | 74/107 |
| 3,688,593 | 9/1972 | Ustin | 74/107 |

Primary Examiner—Lawrence Staab
Attorney, Agent, or Firm—D. A. Rowe; L. G. Vande Zande

[57] ABSTRACT

In combination with a plunger operated device such as a standard pushbutton limit switch (2), an auxiliary rotary actuator (4) having an operating arm (36) attached to a rotary cam(40) having a convex conical cam surface (40c) in contact with a complementary concave conical cam surface (42a) of a reciprocating linear motion cam follower (42), with the cone axes (40d, 42c) being in alignment and offset from the axis of rotation (40e) of the cam. A switch plunger (12) abutting shaft (38) is threaded in a bore (42b) in the cam follower (42) and has a smooth round shaft portion (38b) slidingly guided in a smooth bore (40b) in the cam to be adjustable up or down by a screwdriver slot (38c) in its upper end accessible when the actuating arm (36) mounting screw (46) is removed. An internal thread (24f) whithin the lower end portion (24a) of the auxiliary rotary actuator housing (24) receives the threaded bushing (8) of the plunger operated switch (2) and a set screw (34) turned into the bushing keyway locks it in place.

11 Claims, 2 Drawing Sheets

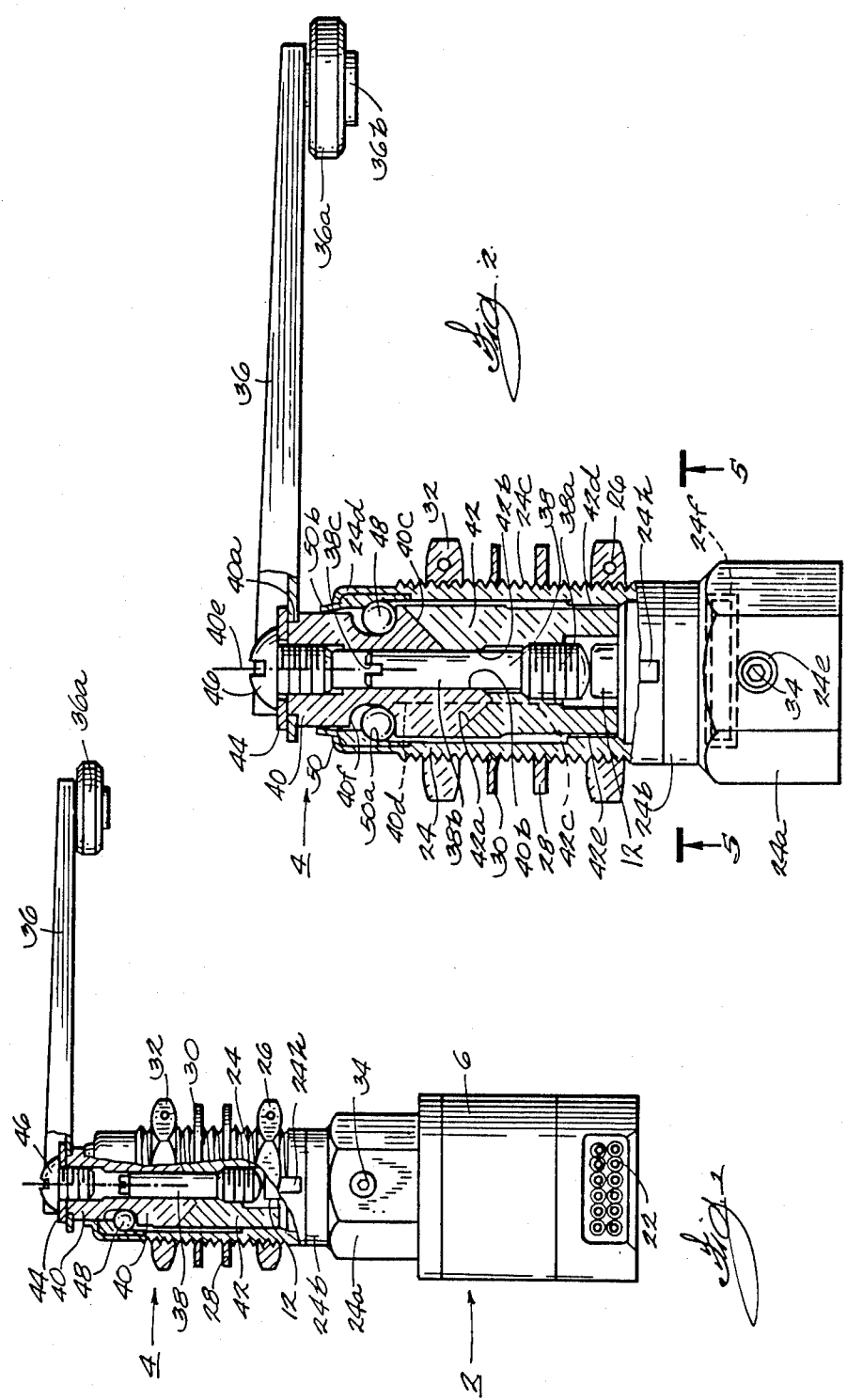

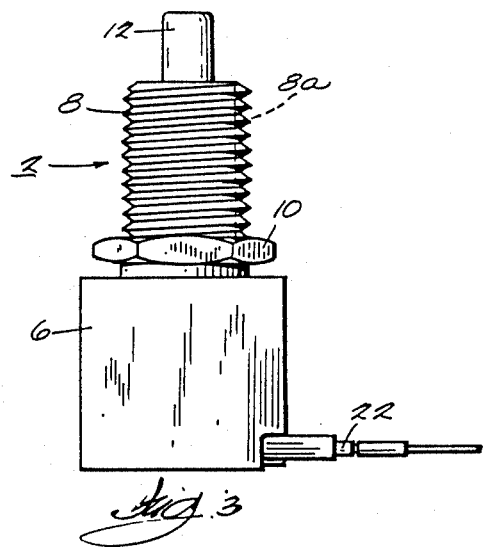
Fig. 3
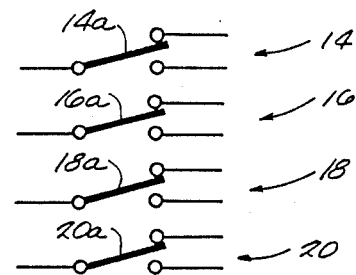
Fig. 4
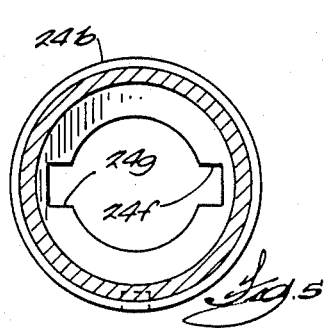
Fig. 5
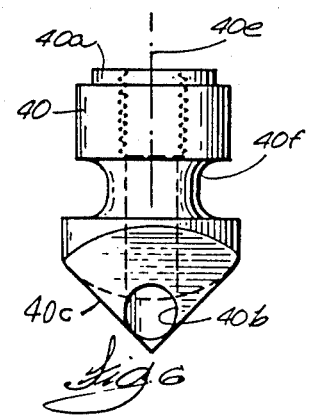
Fig. 6
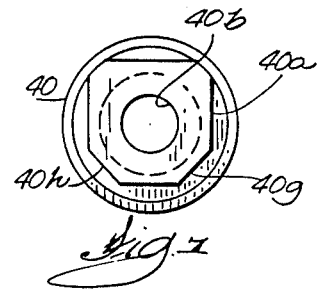
Fig. 7
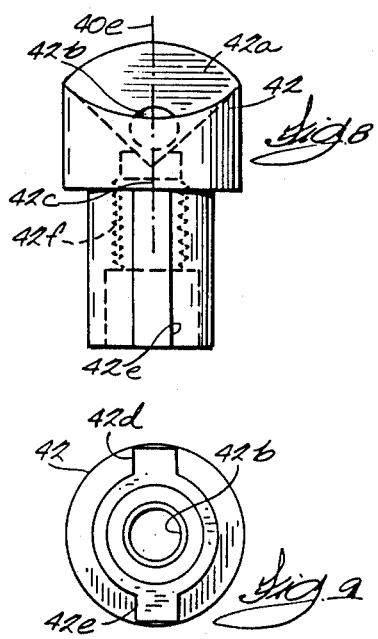
Fig. 8
Fig. 9
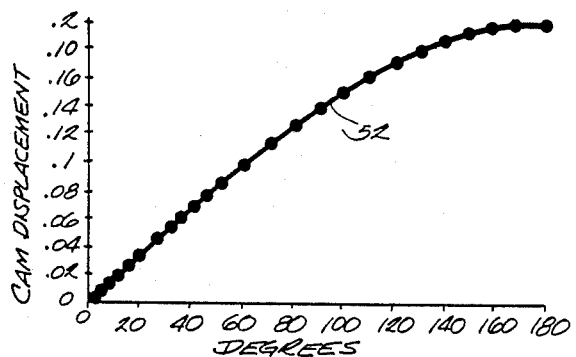
Fig. 10

AUXILIARY ROTARY ACTUATOR FOR A STANDARD PLUNGER OPERATED DEVICE

BACKGROUND OF THE INVENTION

Mechanisms for converting rotary motion to reciprocating linear motion and vice versa have been known heretofore. For example, W. E. Rise U.S. Pat. No. 3,217,901, dated Nov. 16, 1965, shows a transfer mechanism that uses a barrel cam having a curved slot therein and a cam follower of the roller type that runs in such slot for converting rotary motion to linear motion. Also, J. Dietlin U.S. Pat. No. 3,264,949, dated Aug. 9, 1966, shows an apparatus for transforming a rectilinear movement into a rotary movement that uses a hollow cylindrical section provided with a helical slot into which a pin extends so that when the pin is moved, this pin will act on the walls of the slot formed in the cylindrical section so that it is constrained to revolve without it being simultaneously constrained to move axially. While these power devices have been useful for their intended purposes, they have nevertheless been handicapped by certain disadvantages such as high force gradient with angular displacement, being rather complicated in design, and subject to considerable wear in use. Accordingly, it has been found desirable to provide improved means for converting rotary motion to reciprocating linear motion that does not have these disadvantages as hereinafter described.

SUMMARY OF THE INVENTION

An object of the invention is to provide improved means for converting rotary motion to reciprocating linear motion for use in operating a standard plunger operated device.

A more specific object of the invention is to provide improved means of the aforementioned type that has low force gradient with angular displacement.

Another specific object of the invention is to provide improved means of the aforementioned type that is subject to less wear in use and is therefore longer lasting.

Another specific object of the invention is to provide improved means of the aforementioned type that reduces wear by causing a line contact between relatively movable parts to shift continuously as rotary motion is applied thereto.

Another specific object of the invention is to provide improved means of the aforementioned type that is simple in design and economical to manufacture.

Another specific object of the invention is to provide improved means of the aforementioned type that can be used with a standard plunger actuated device such as a pushbutton operated limit switch or the like.

Other objects and advantages of the invention will hereinafter appear.

BRIEF DESCRIPTION OF THE DRAWINGS

FIG. 1 is an enlarged elevational view partly in section of the combination of a standard plunger operated device such as a pushbutton limit switch and an auxiliary rotary actuator for such device attached thereto.

FIG. 2 is an enlarged elevational view partly in section of the auxiliary rotary actuator of FIG. 1.

FIG. 3 is an enlarged elevational view of a standard plunger operated limit switch which is arranged and adapted for use in combination with the auxiliary rotary actuator of FIG. 2 as shown in FIG. 1.

FIG. 4 is a schematic diagram of the four double throw contacts of the switch of FIG. 3.

FIG. 5 is a cross-sectional view of the housing of the auxiliary rotary actuator taken substantially along line 5—5 of FIG. 2 and with all other parts removed.

FIG. 6 is a right side view of the cam used in the auxiliary rotary actuator of FIG. 2.

FIG. 7 is a top view of the cam of FIG. 6.

FIG. 8 is a left side view of the cam follower used in the auxiliary rotary actuator of FIG. 2.

FIG. 9 is a bottom view of the cam follower of FIG. 8.

FIG. 10 is a graph depicting linear cam follower displacement versus cam rotary motion through 0–180 degrees rotation, the linear displacement versus rotary motion through 180–360 degrees being a mirror image thereof.

DESCRIPTION OF THE PREFERRED EMBODIMENT

Referring to FIG. 1, there is shown the combination of a standard plunger operated device such as a pushbutton 2 and an auxiliary rotary actuator 4 for such device constructed in accordance with the invention.

As shown in FIG. 3, limit switch 2 is of the conventional type in that it is provided with a housing 6 enclosing the contacts shown schematically in FIG. 4. This switch is of the one hole mounting type, meaning that it has been adapted for mounting into a single hole in a mounting panel or bracket and is provided with an externally threaded bushing 8, on which a nut 10 has been turned all the way down, and a vertical keyway across the thread. When this type of switch is mounted into a single hole in a mounting panel, it is also provided with a keying washer and a lock washer and a second nut so that nut 10 abuts the rear side of the panel and the keying washer and the lock washer and the second nut are assembled onto the bushing on the front of the panel to rigidly secure the switch to the panel. However, in this application the two washers and the second nut have been omitted since they are not needed as will hereinafter appear. This switch is also provided with a pushbutton actuator in the form of a plunger 12 which may be depressed to actuate the contacts shown in FIG. 4. As an example, this switch may be provided with four sets of double throw contacts 14, 16, 18 and 20 as shown in FIG. 4 with the movable contacts 14a, 16a, 18a and 20a being normally spring biased to a first position engaging the respective normally closed stationary contacts and which can be actuated to a second position by depression of plunger 12 to engage the respective normally open contacts, all in a conventional manner. As shown in FIG. 3, housing 6 of the switch is also provided with an opening at its lower portion through which extend the twelve conductors indicated generally by 22 in FIGS. 1 and 3. As shown in FIG. 4, four of these conductors are connected to the movable contacts and the remaining eight of these conductors are connected to the stationary contacts and are provided for connecting the switch to an external circuit.

While a pushbutton switch has been shown in combination with auxiliary rotary actuator 4 in FIG. 1 for exemplary purposes, it will be apparent that other plunger operated devices could be used with auxiliary rotary actuator 4 in place thereof.

The manner in which plunger operated device 2 is attached to auxiliary rotary actuator 4 will be hereinafter described in connection with FIG. 2.

As shown in FIG. 2, auxiliary rotary actuator 4 is provided with a generally tubular housing 24 having a slightly enlarged lower end portion 24a hexagonal on its outside whereby it can be gripped by a wrench or the like when assembling it onto the plunger operated switch 2. Immediately above this hexagonal portion 24a this tubular housing has a portion 24b that is round on the outside as shown in FIG. 5. Immediately above this round portion 24b, this tubular housing is provided with an externally threaded portion 24c that extends almost all the way to its upper end on which are assembled a first nut 26, a keyway washer 28, a lock washer 30 and another nut 32 whereby this auxiliary rotary actuator 4 may be mounted into a hole in a panel or supporting bracket or the like. The extreme upper end portion of tubular housing 24 is provided with a thin cylindrical portion 24d the upper edge of which may be crimped inwardly after all the parts have been assembled into this housing as hereinafter described.

Housing 24 is also provided at its hexagonal portion 24a with a threaded hole 24e extending from the outside all the way through to the interior of the housing into which is threaded a set screw 34 for locking this housing 24 to the threaded bushing 8 of plunger operated switch 2. As shown in broken lines in FIG. 2, housing 24 is provided on the inside thereof immediately above set screw hole 24e with a short threaded portion 24f for receiving threaded bushing 8 of plunger operated switch 2 as hereinafter described.

As shown in FIG. 2, this auxiliary rotary actuator 4 is provided with means for converting rotary motion at actuator arm 36 to reciprocating linear motion at adjustable shaft 38. For this purpose, there is provided a rotary conical cam 40 and a cam follower 42. The upper end of cam 40 extends through and slightly above the upper end of housing 24 of the bushing type and is provided with a noncircular configuration 40a shown in FIG. 7 that fits into a complementary hole in actuator arm 36 to nonrotatably attach the arm to the cam by a flat washer 44 and a round head screw 46 that is threaded into the upper end of a hole that extends through cam 40 on its axis of rotation. Cam 40 has a bore 40b extending therethrough along its axis of rotation. The lower end of cam 40 is provided with a convex cam surface 40c in the form of a modified right circular cone having its cone axis 40d offset to one side from its axis of rotation 40e as shown in FIG. 2.

The upper end of tubular housing 24 is provided with means for rotatably mounting cam 40 therein. This means comprises a plurality such as eight ball bearings 48 held in an annular bearing groove 40f around cam 40 by a combination seal and ball retainer 50 in the form of a cylindrical member that surrounds ball bearings 48 as well as the ball bearing retaining groove 40f and has a rounded annular surface 50a that engages the ball bearings and confines them in the groove 40f and along which the ball bearings roll as cam 40 is rotated. This combination seal and ball retainer is also provided with means for sealing the upper end of the housing around cam 40. This means comprises a thin cylindrical upper portion 50b which is resilient so that it can be pressed into contact around cam 40 when the upper thin end portion 24d of the housing is crimped thereagainst as shown in FIG. 2.

This cam 40 is more clearly shown in FIGS. 6 and 7. As shown in FIG. 7, the noncircular configuration 40a at the top of cam 40 for nonrotatably attaching arm 36 may be generally in the form of a square with two corners 40g and 40h cut off so that when it is inserted into a similar hole in operating arm 36 and clamped therein by washer 44 and screw 46, the cam will be nonrotatably attached to the arm. Also as shown in FIG. 6 and FIG. 2, it will be apparent that the cam surface 40b on cam 40 is modified from the form of a right circular cone by providing the same with a uniform radius from its axis of rotation 40e rather than from its cone axis 40d.

Cam follower 42 is provided at its upper end with a concave cam surface 42a that is complementary to the convex cam surface 40c of cam 40 and likewise having a bore 42b therethrough along axis of rotation 40e of cam 40 and its cone axis 42c is similarly offset from axis of rotation 40e as shown in FIG. 2. This concave cam surface 42a of cam follower 42 is also modified from the form of a right circular cone by providing the same with a uniform radius from axis of rotation 40e rather than from its cone axis 42c. At its lower portion, cam follower 42 is provided with a pair of keys 42d and 42e on opposite sides on the outside thereof as shown in FIGS. 8 and 9 that slide in complementary keyways 24g and 24f shown in FIGS. 2 and 5 thereby to guide the cam follower in its reciprocating linear motion. The center portion of bore 42b in cam follower 42 is provided with an internal thread 42f as shown in broken lines in FIG. 8 for receiving the externally threaded lower end portion 38a of shaft 38 as shown in FIG. 2. The remainder of the upper end 38b of the shaft is round and smooth and extends up into smooth bore 40b in cam 40 as shown in FIG. 2. The extreme upper end of shaft 38 is provided with a screwdriver slot 38c so that when operating arm 36 including its retaining screw 46 and washer 44 have been removed, a screwdriver can be inserted into bore 40b to adjust shaft 38 up or down thereby to readily afford adjustment of the bias of plunger 12 on this shaft 38 and also the operating point of the plunger operated device or the pretravel of the contacts of the switch. As shown in FIG. 2, the lower end of shaft 38 is provided with a spherical segment form for engaging the plunger 12 and whereby the spring bias in the plunger operated switch maintains cam follower 42 in good contact with cam 40.

Operating arm 36 is rather conventional in form and is provided at its free end with a roller 36a which is attached to the arm by a shaft in the form of a headed journal pin 36b or the like. The outside of tubular housing 24 is provided with a vertical keyway 24h for receiving the key of washer 28 in a conventional manner.

FIG. 10 depicts in graphic form the linear movement of the cam follower 42 through 180 degrees of rotation of cam 40. As shown by curve 52 therein, cam follower 42 has a smooth linear displacement in response to 180 degrees rotation of cam 40. As will be apparent, when cam 40 is rotated 180 degrees, cam follower 42 moves down and on the next 180 degrees rotation of cam 40, cam follower 42 moves back up following a smooth curve which is a mirror image of curve 52.

If plunger operated device 2 is a switch as indicated by FIGS. 3 and 4, its threaded bushing 8 would be threaded into the lower end portion of tubular housing 24 engaging internal threads 24f thereof so that plunger 12 thereof would extend into the space below the lower end of shaft 38. When device 2 is fully threaded therein, it is then rotated back until its keyway lines up with the set screw and set screw 34 would then be tightened into the keyway to lock plunger operated device 2 in place at the lower end of auxiliary rotary actuator 4. A screwdriver is then inserted into the bore 40b of cam 40 and shaft 38 is adjusted into proper contact and pressure against plunger 12. Thereafter arm 36 is placed on the upper end of cam 40 and washer 44 and screw 46 assembled to connect the operating arm to cam 40.

Normally, when a switch such as 2 is used in conjunction with this auxiliary rotary actuator, shaft 38 would be adjusted so that arm 36 need be moved only 90 degress to actuate the switch. However, other plunger operated devices than switches could be used with this auxiliary rotary actuator arranged for different angles of rotation of cam 40 to operate the same. For example, rotary actuator 4 may be used for a variety of different purposes. One such use would be for an oscillating piston pump by enclosing the cam follower in a tube with a check valve whereby a positive displacement oscillating pumping action would occur. Another use for this device would be for a self returning mechanism wherein rotation of the cam causes the cam to rise on a stationary cam follower so that the weight of the mechanism or a spring bias causes the cam to return down the cam follower to the rest position. Another possible use would be for clamping devices wherein the linear movement generated by rotating the cam can be used for devising various clamping devices. Another possible use would be for a metering mechanism since the linear motion is precise for every 360 degree rotation of the cam and positive displacement is easily obtainable so that this would be capable of metering out precise amounts of fluids, epoxies, etc. Other possible uses will be apparent to those skilled in the art.

As shown in FIGS. 6 and 8 in the drawings, the cam and cam follower have substantially a 45 degree cam angle with respect to the cam axis and the cam vertex or apex or cam axis is offset, for example, substantially 0.100 inch from the axis of rotation. This results in a 0.200 inch linear displacement through 180 degrees of rotation of the cam. It will readily be apparent that other cam angles and offsets are possible for particular applications. Knowing the cam angle and the apex offset, the linear displacement can be found by the formula:

$$B = 2A(\cot D \text{ DEGREES})$$

wherein B is the linear displacement, A is the apex offset and the symbol in parenthesis is the cotangent of the cam angle D in degrees. Also, having the linear displacement and the cam angle, the offset can be found with the formula:

$$A = \frac{B (\tan D)}{2}$$

wherein A is the apex offset, B is the linear displacement and the symbol in parenthesis is the tangent of the cam angle D in degrees.

While the apparatus hereinbefore described is effectively adapted to fulfill the objects stated, it is to be understood that the invention is not intended to be confined to the particular preferred embodiment of auxiliary rotary actuator for a standard plunger operated device disclosed, inasmuch as it is susceptible of various modifications without departing from the scope of the appended claims.

We claim:
1. In combination, a plunger operated device having a mounting portion through which its plunger extends and an auxiliary rotary actuator for such device, said auxiliary rotary actuator comprising:
   a housing comprising means at one portion thereof for rigidly securing the same to said mounting portion of said device so that said plunger thereof extends into said housing;
   means in said housing for converting rotary motion to reciprocating linear motion comprising:
   a rotary cam having an axis of rotation;
   means mounting said rotary cam in said housing for rotary motion on said axis of rotation with one end portion of said rotary cam being accessible from the exterior of another portion of said housing for external actuation thereof;
   a convex cam surface on the other end portion of said rotary cam in the form of a modified right circular cone having its cone axis offset from said axis of rotation;
   a reciprocative cam follower having a first end portion engaging said convex cam surface and a second end portion extending toward said device;
   a concave cam surface on said first end portion of said reciprocative cam follower in the form of a modified right circular cone substantially complementary to said convex cam surface of said rotary cam and having its cone axis correspondingly offset from said axis of rotation, said axis of rotation penetrating said modified right circular cone cam surfaces, rotation of said cam effecting rolling engagement of said convex cam surface along said concave cam surface to move said cam follower linearly;
   means guiding said cam follower for reciprocating linear motion with respect to rotary cam with in said housing;
   and means on said cam follower located and arranged to engage said plunger for actuating the same.
2. The combination claimed in claim 1 wherein:
   said means mounting said rotary cam in said housing for rotary motion on said axis of rotation comprises:
   bearing means in said housing;
   and an annular journal on said cam positioned in said bearing means for rotation therein.
3. The combination claimed in claim 1, wherein:
   said plunger operated device comprises spring means biasing said plunger outwardly;
   and said means on said cam follower located and arranged to engage said plunger is biased by said spring biased plunger so as to maintain said concave cam surface of said cam follower pressed against said convex cam surface of said cam.
4. The combination claimed in claim 1, wherein:
   each said cam surface is modified from the form of a right circular cone by providing the same with a uniform radius from said axis of rotation rather than from its cone axis.
5. The combination claimed in claim 4, wherein:
   said convex and concave cam surfaces have continuously shifting engagement throughout a complete revolution of said rotary cam.
6. The combination claimed in claim 1, wherein:
   each said cam surface is modified from the form of a right circular cone in that the length of its generatrix or slant height continuously varies in opposite directions throughout respective 180 degree angles thereof.

7. The combination claimed in claim 1, wherein:
said means guiding said cam follower for reciprocating linear motion with respect to said cam comprises symmetrically arranged key and keyway pairs in said housing and on said cam follower arranged parallel to one and to said axis of rotation.

8. The combination claimed in claim 1, wherein:
said means guiding said cam follower for reciprocating linear motion with respect to said cam and said means on said cam follower located and arranged to engage said plunger for actuating the same comprise:
aligned bores through said cam and cam follower on said axis of rotation with said bore in said cam follower having an internal thread;
a shaft externally threaded at one end and turned into said internal thread of said bore of said cam follower;
and said shaft having a stem slidably extending into said bore in said cam whereby said bore in said cam acts through said shaft to guide said cam follower in its reciprocating movement and said shaft may be adjusted to set the operating point of said plunger operated device.

9. The combination claimed in claim 8, wherein:
said externally threaded end of said shaft is provided with a spherical segment which is engaged by said plunger to maintain said cam follower in contact with said cam.

10. The combination claimed in claim 9, wherein:
said plunger operated device comprises means resiliently biasing said plunger outwardly against said spherical segment end of said shaft;
and the end of said stem comprises means for receiving a tool inserted through said bore in said cam for turning said shaft in or out thereby to readily afford adjustment of the bias of said plunger on said shaft and the operating point of said plunger operated device.

11. The combination claimed in claim 1, wherein:
said one end portion of said cam is provided with means for non-rotatably attaching an external actuator member thereto.

* * * * *